(12) United States Patent
Black

(10) Patent No.: US 7,821,574 B2
(45) Date of Patent: *Oct. 26, 2010

(54) METHOD AND APPARATUS FOR SYNCHRONIZING AUDIO AND VIDEO STREAMS

(75) Inventor: David Robert Black, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 798 days.

This patent is subject to a terminal disclaimer.

(21) Appl. No.: 11/561,885

(22) Filed: Nov. 20, 2006

(65) Prior Publication Data

US 2007/0092200 A1      Apr. 26, 2007

Related U.S. Application Data

(63) Continuation of application No. 10/407,954, filed on Apr. 5, 2003, now Pat. No. 7,142,250.

(51) Int. Cl.
*H04N 9/475* (2006.01)

(52) U.S. Cl. ..................... 348/515; 348/512

(58) Field of Classification Search ........... 348/512, 348/515, 482, 180, 722; 381/56, 58, 94.1, 381/306; 375/240.28
See application file for complete search history.

(56) References Cited

U.S. PATENT DOCUMENTS

| | | | | |
|---|---|---|---|---|
| 5,111,292 A | * | 5/1992 | Kuriacose et al. ...... | 375/240.01 |
| 5,572,261 A | | 11/1996 | Cooper | |
| 5,594,627 A | * | 1/1997 | Le .............. | 361/801 |
| 5,764,965 A | * | 6/1998 | Poimboeuf et al. .......... | 713/400 |
| 5,768,292 A | * | 6/1998 | Galbi ......... | 714/747 |
| 5,883,804 A | * | 3/1999 | Christensen ......... | 700/94 |
| 6,134,522 A | * | 10/2000 | Leckschat .................. | 704/226 |
| 6,184,937 B1 | | 2/2001 | Williams et al. | |
| 6,243,032 B1 | | 6/2001 | Uramoto et al. | |
| 6,429,902 B1 | * | 8/2002 | Har-Chen et al. ........... | 348/518 |
| 6,577,735 B1 | * | 6/2003 | Bharat .......... | 380/286 |
| 6,630,963 B1 | * | 10/2003 | Billmaier .......... | 348/485 |
| 6,744,815 B1 | * | 6/2004 | Sackstein et al. ............ | 375/240 |
| 6,904,566 B2 | | 6/2005 | Feller et al. | |
| 6,967,599 B2 | * | 11/2005 | Choi et al. .................... | 341/61 |
| 6,968,564 B1 | | 11/2005 | Srinivasan | |
| 7,206,986 B2 | * | 4/2007 | Stemerdink et al. ......... | 714/747 |
| 7,317,840 B2 | * | 1/2008 | DeCegama ................. | 382/240 |
| 7,383,509 B2 | * | 6/2008 | Foote et al. ................. | 715/731 |
| 2002/0008778 A1 | * | 1/2002 | Grigorian ................... | 348/484 |
| 2002/0034144 A1 | * | 3/2002 | Kotani ..................... | 369/59.25 |
| 2002/0101368 A1 | * | 8/2002 | Choi et al. .................... | 341/61 |
| 2002/0138795 A1 | * | 9/2002 | Wang ....................... | 714/707 |
| 2002/0177967 A1 | * | 11/2002 | Fuchs et al. ................. | 702/113 |
| 2003/0049015 A1 | | 3/2003 | Cote et al. | |
| 2004/0114904 A1 | | 6/2004 | Sun et al. | |
| 2004/0120554 A1 | | 6/2004 | Lin et al. | |

(Continued)

*Primary Examiner*—Victor Kostak
(74) *Attorney, Agent, or Firm*—Adeli & Tollen LLP

(57) ABSTRACT

Some embodiments of the invention provide a method for synchronizing an audio stream with a video stream. This method involves searching in the audio stream for audio data having values that match a distinct set of audio data values and synchronizing the audio stream with the video stream based on the search. In some embodiments, the distinct set of audio data values is defined by a predetermined distinct tone. In other embodiments, the distinct set of audio data values is defined by audio data contained in the video stream.

24 Claims, 15 Drawing Sheets

U.S. PATENT DOCUMENTS

| | | |
|---|---|---|
| 2004/0122662 A1 | 6/2004 | Crockett |
| 2005/0042591 A1* | 2/2005 | Bloom et al. ........... 434/307 A |
| 2005/0273321 A1 | 12/2005 | Choi |
| 2006/0156374 A1* | 7/2006 | Hu et al. .................... 725/135 |

* cited by examiner

METHOD AND APPARATUS FOR SYNCHRONIZING AUDIO AND VIDEO STREAMS

CLAIM OF BENEFIT TO PRIOR APPLICATIONS

This application is a continuation application of U.S. patent application Ser. No. 10/407,954, filed Apr. 5, 2003, now issued as U.S. Pat. No. 7,142,250, which is incorporated herein by reference.

FIELD OF THE INVENTION

The invention is directed towards a method and apparatus for synchronizing audio and video streams.

BACKGROUND OF THE INVENTION

Maintaining synchronization between audio and video streams is an important aspect of a multimedia presentation. When content of audio and video components are captured, the signals are often processed in separate pipelines, which typically causes the synchronization relationship between the audio and video components to be lost. Without a proper synchronization relationship being re-established between the captured audio and video streams, there can be no guarantee that the audio stream will correctly coincide with the video stream upon broadcast or playback. Also, the divergence between the audio and video streams may increase with the duration of a broadcast or playback.

The prior art does not provide a simple and effective technique for re-establishing a synchronous relationship between captured audio and video streams once the synchronous relationship between the streams has been lost. Therefore, there is a need for a simple and effective method that re-establishes the synchronous relationship between captured audio and video streams.

SUMMARY OF THE INVENTION

Some embodiments of the invention provide a method for synchronizing an audio stream with a video stream. This method involves searching in the audio stream for audio data having values that match a distinct set of audio data values and synchronizing the audio stream with the video stream based on the search. In some embodiments, the distinct set of audio data values is defined by a predetermined distinct tone. In other embodiments, the distinct set of audio data values is defined by audio data contained in the video stream.

Some embodiments of the invention provide a method for determining a calculated sampling rate of audio samples contained in a video stream and applying the calculated sampling rate to an audio stream. The method includes receiving an audio stream of audio samples where the audio stream has an associated sampling rate. The method further includes receiving a video stream containing video frames and audio samples, the audio samples being duplicates of at least some of the audio samples in the audio stream. The method finally includes determining a calculated sampling rate of the audio samples in the video stream and modifying the sampling rate associated with the audio stream to match the calculated sampling rate.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION OF THE INVENTION

In the following description, numerous details are set forth for purpose of explanation. However, one of ordinary skill in the art will realize that the invention may be practiced without the use of these specific details. In other instances, well-known structures and devices are shown in block diagram form in order not to obscure the description of the invention with unnecessary detail.

Some embodiments of the invention provide a method for synchronizing an audio stream with a video stream. This method involves (1) searching in the audio stream for audio data having values that match a distinct set of audio data values and (2) synchronizing the audio stream with the video stream based on the search. In some embodiments, the distinct set of audio data values is defined by a predetermined distinct tone. These embodiments are described below in relation to section I. In other embodiments, the distinct set of audio data values is defined by audio data contained in the video stream. These embodiments are described below in relation to section II.

Figure 1:
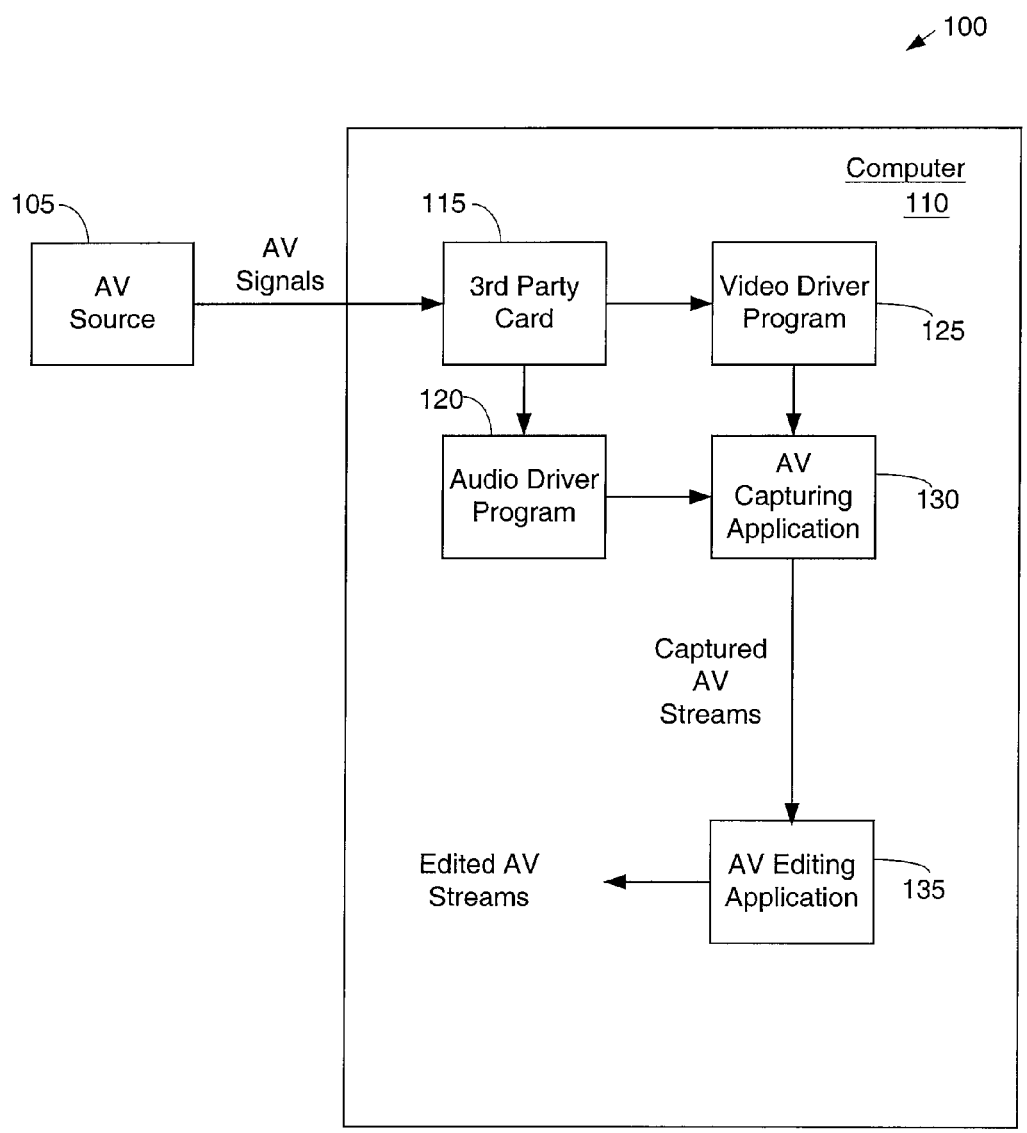
FIG. 1 illustrates a conceptual diagram of an environment where some embodiments of the invention are implemented.

I. FIG. 1 illustrates a conceptual diagram of an environment 100 where some embodiments of the invention are implemented. As shown in FIG. 1, the environment 100 includes an audio/video source (AV source) 105 and a computer 110. The computer 110 contains a third party card 115, an audio driver program 120, a video driver program 125, an audio/video capturing application (AV capturing application) 130, and an audio/video editing application (AV editing application) 135.

The AV source 105 provides audio and video signals (AV signals) to the computer 110. The AV source 105 can be any source providing AV signals such as a video tape deck, VCR, video camera, etc. The AV source 105 may provide high definition and uncompressed formats, digital or analog AV signals, a single multiplexed stream of AV signals or a separate audio signal and a separate video signal.

When the AV source 105 sends multiplexed AV signals to the computer 110 (e.g., through a serial digital port), the third party card 115 separates the multiplexed AV signals into discrete audio and video signals. When the AV source 105 sends separate audio and video signals to the computer 110 (e.g., through individual audio and video plugs), the third party card 115 passes the separate audio and video signals to the audio driver program 120 and the video driver program 125, respectively.

The third party card 115 may be a video I/O board, an analog card, or the like. The third party card 115 typically has audio and video inputs and outputs having, for example, serial digital video, composite video, or S video ports. Also, the third party card 115 can typically resample audio signals with non-standardized sampling rates that are received from the AV source 105. The third party card 115 can resample a non-standardized audio signal to a standardized sampling rate recognized by the AV capturing application 130 and the AV editing application 135. Examples of companies making such third party cards are, for example, Pinnacle, Aurora, and Creative Labs.

Regardless of whether the third party card 115 receives multiplexed AV signals or separate AV signals, the third party card 115 sends a separate audio signal to the audio driver program 120 and a separate video signal to the video driver program 125. Typically, the AV signals have a synchronous relationship when they are received by the third party card 115. During the time between the separation of the audio and video signals by the third party card 115 and capture of the audio and video signals by the AV capturing application 130, however, the synchronous relationship between the audio and video signals is lost.

After the third party card 115, the audio signal is processed by the audio driver program 120 and the video signal is processed by the video driver program 125. The audio and video driver programs 120 and 125 are hardware specific drivers that are configured to work specifically with the third party card 115. The drivers provide an interface between the third party card 115 and hardware and software resources of the computer 110 (e.g., the AV capturing application 130 or the AV editing application 135) that may need to communicate with the third party card 115.

The audio driver program 120 passes the audio signal to the AV capturing application 130 which captures the audio signal as an audio stream. The audio stream contains a series of audio data. Each instance of audio data in the series of audio data is also known as an audio sample. The video driver program 125 passes the video signal to the AV capturing application 130 which captures the video signal as a video stream. The video stream is comprised of a series of video frames each containing a series of video data. A synchronization relationship between the audio and video signals may have already been lost by the time the AV capturing application 130 captures the audio and video signals. Therefore, without use of the present invention, the captured audio and video streams may not be in synchronization and playback or broadcast of the captured audio and video streams will produce a multimedia presentation that is not in synchronization.

The present invention provides a method for synchronizing the captured audio stream and video streams by having the third party card 115 generate and send a distinct tone for capture in the audio stream by the AV capturing application 130. The length of the distinct tone provides a synchronization offset that the AV editing application 135 uses to adjust the captured audio and video streams to produce edited audio and video streams that are in synchronization. The AV capturing application 130 may be any application capable of capturing or recording data of audio and video signals (e.g., QuickTime® by Apple Computer, Inc.). The AV editing application 135 may be any application capable of editing captured audio and video streams (e.g., Final Cut Pro® by Apple Computer, Inc.).

Figure 2:
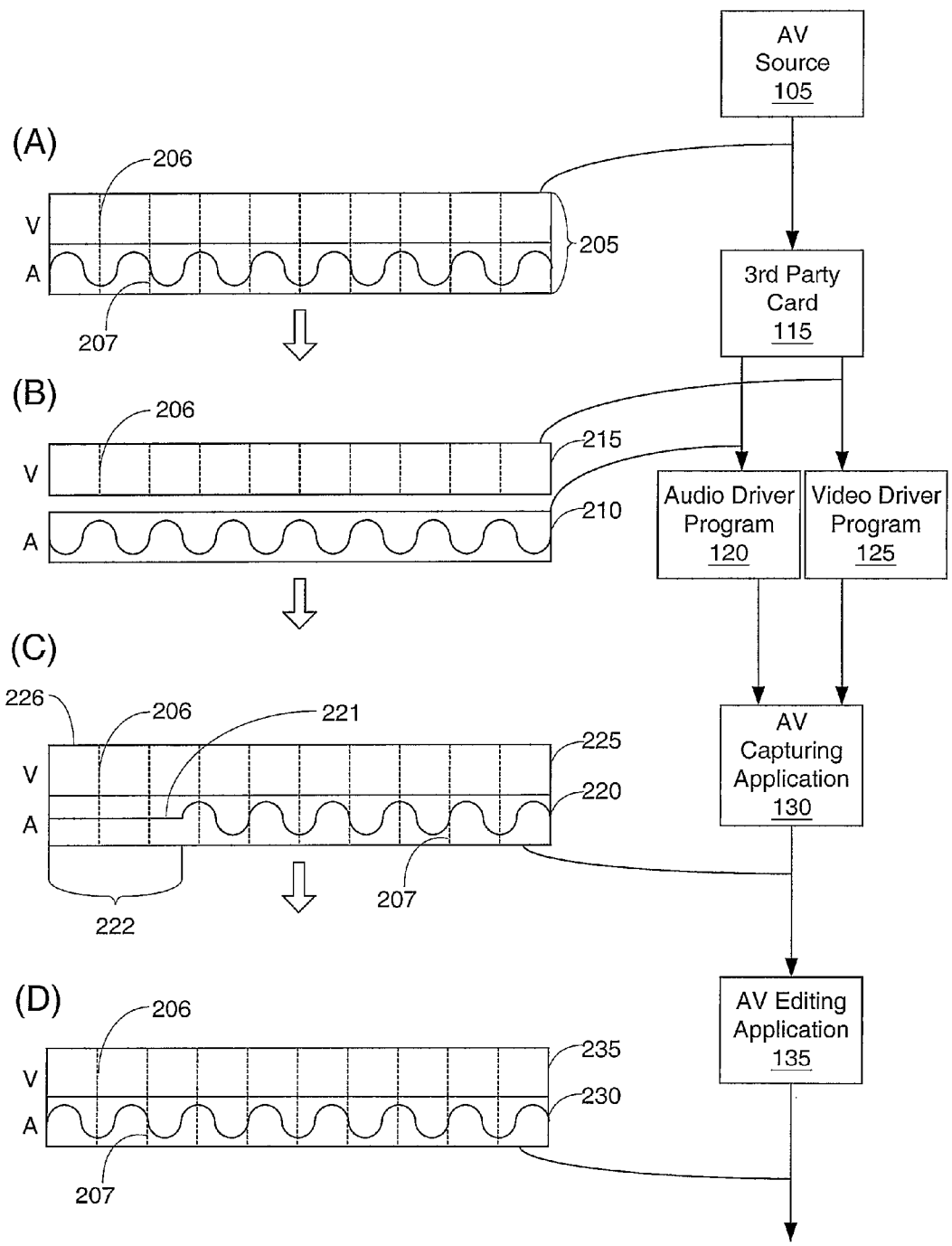
FIG. 2 illustrates conceptual diagrams of audio and video signals as they are processed in the environment shown in FIG. 1.

FIG. 2 parts A through D illustrate conceptual diagrams of audio and video signals as they are processed in the environment shown in FIG. 1. Part A of FIG. 2 shows AV signals 205 that are sent by the AV source 105 to the third party card 115. The AV signals 205 may be presented as multiplexed AV signals or as separate audio and video signals. The video signal portion of the AV signals 205 is comprised of a series of video frames, each video frame being separated by a video frame boundary 206 and containing a series of video data. The audio signal portion of the AV signals 205 is comprised of a series of audio frames, each audio frame being separated by an audio frame boundary 207 and containing a series of audio data.

Between the audio and video signals 205 received by the third party card 115, there typically is a synchronous relationship between each video frame boundary 206 of the video signal and an audio frame of the audio signal. After the third party card 115 receives the AV signals 205, the third party card 115 sends a separate audio signal 210 to the audio driver program 120 and a separate video signal 215 to the video driver program 125 (shown in part B of FIG. 2). During the separation of the audio and video signals, any synchronization information between the signals may be lost. Therefore, the AV editing application 135 will not assume that there is a synchronous relationship between a video frame boundary 206 of the video signal and an audio frame of the audio signal.

The AV capturing application 130 receives the separate audio signal 210 from the audio driver program 120 and the separate video signal 215 from the video driver program 125. From the received signals, the AV capturing application 130 produces a captured audio stream 220 and a captured video stream 225 (shown in part C of FIG. 2). The captured audio stream 220 contains a series of audio data (each instance of audio data being referred to as an audio sample). The captured video stream 225 is comprised of a series of video frames each containing a series of video data.

In some embodiments of the invention, the captured audio stream 220 contains instances of distinct tone audio data 221 (i.e., distinct tone audio samples) generated by the third party card 115. The length of the distinct tone audio data 221 can be measured, for example, by the number of audio data instances (i.e., audio samples) in the distinct tone audio data 221. The length of the distinct tone audio data 221 can also be measured, for example, by a time duration corresponding to the number of audio data instances in the distinct tone audio data 221 (the time duration also being determined by the sampling rate of the audio data).

The length of the distinct tone audio data 221 is referred to as the synchronization offset 222. Using the synchronization offset 222, the AV editing application 135 synchronizes the captured audio stream 220 with the captured video stream 225 to produce an edited audio stream 230 and an edited video stream 235 (shown in part D of FIG. 2) that are in synchronization with one another.

Figure 3:
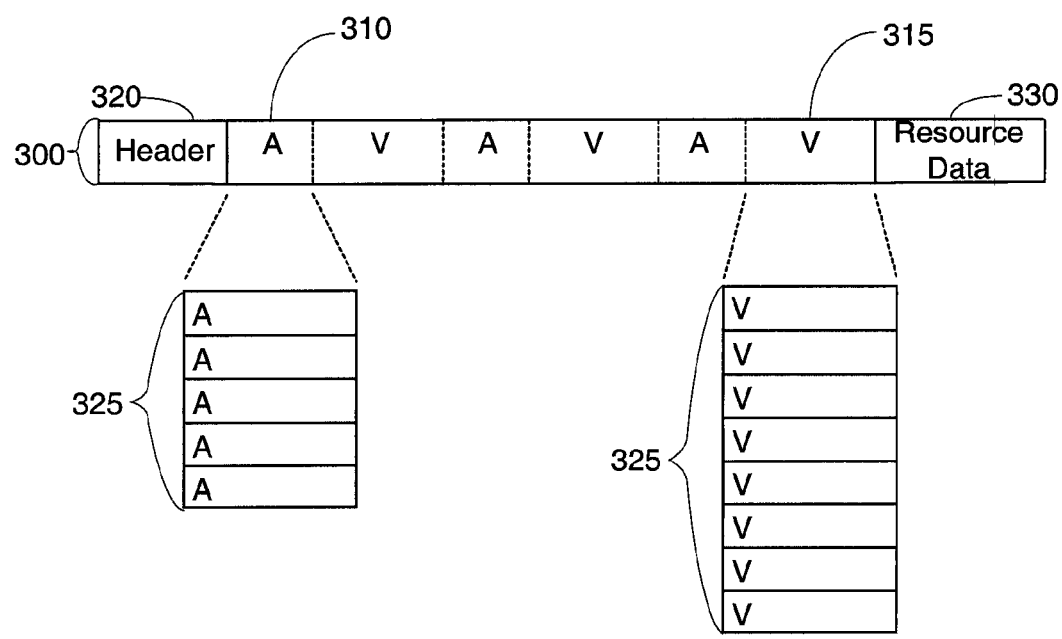
FIG. 3 illustrates a diagram of data packets of multiplexed audio and video streams.

Typically, the AV capturing application 130 and the AV editing application 135 multiplex audio and video streams into one data stream. FIG. 3 illustrates a diagram of an audio data packet 310 and a video data packet 315 of multiplexed audio and video streams 300 that form one data stream. As shown in FIG. 3, the multiplexed audio and video streams 300 is comprised of a header section 320, a resource data section 330, and interleaved audio and video data packets 310 and 315.

The header section 320 contains routing data such as origin and destination information and the like. The resource data section 330 typically contains data that imposes order or describes the audio or video data contained in the multiplexed audio and video streams 300. For example, the resource data section 330 may include data that indicates the sampling rate of the audio or video data contained in the multiplexed audio and video streams 300. In some embodiments of the invention, the resource data section 330 utilizes synchronization offset data to synchronize the captured audio stream 220 with the captured video stream 225.

Each of the audio and video data packets 310 and 315 in the multiplexed audio and video streams 300 is comprised of a body section 325 that contains audio or video data. In the example shown in FIG. 3, the body section 325 of the audio data packet 310 contains audio data for 5 audio frames and the body section 325 of the video data packet 315 contains video data for 8 video frames.

Figure 4:
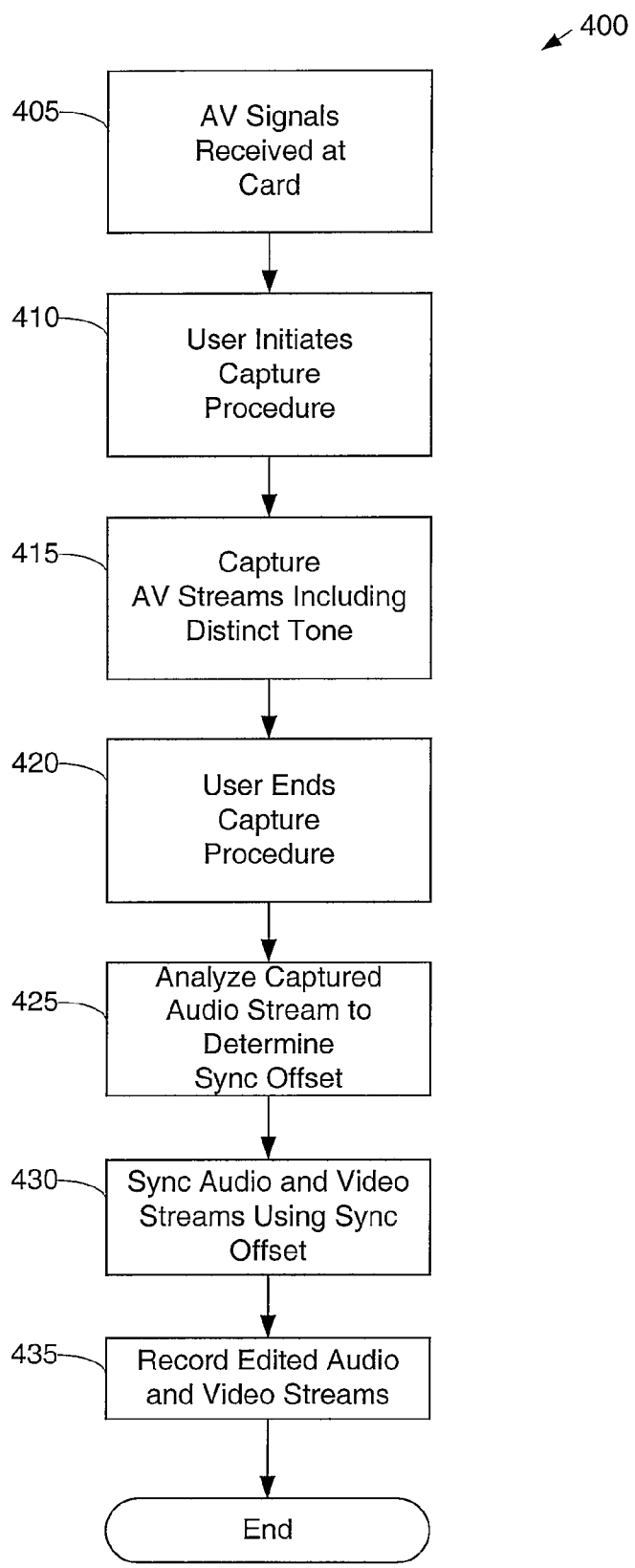
FIG. 4 illustrates a general process for synchronizing captured audio and video streams.

FIG. 4 illustrates a general process 400 performed by components of the computer 110 for synchronizing captured audio and video streams. Initially, AV signals are received (at 405) by the third party card 115 from the AV source 105. A user initiates (at 410) a capture procedure of the AV capturing application 130, for example, by selecting a capture option of the AV capturing application 130 or the AV editing application 135 through a graphical user interface ("GUI"). The user can interact with the GUI through traditional GUI operations, such as click operations (e.g., to select an item), click-and-drag operations (e.g., to move an item), etc.

The AV capturing application 130 receives and captures (at 415) the AV signals from the third party card 115 to produce captured audio and video streams. The captured audio stream also includes a distinct tone generated by the third party card 115. The captured video stream is comprised of a series of video frames each containing a series of video data and the captured audio stream is comprised of a series of audio frames each containing a series of audio data (as described above in relation to FIG. 3).

The user then ends (at 420) the capture procedure, for example, by selecting a capture ending option of the AV capturing application 130 or the AV editing application 135 through the GUI. The AV editing application 135 then receives the captured audio and video streams from the AV capturing application 130 and analyzes (at 425) the captured audio stream to determine the length of the distinct tone in the captured audio stream. The length of the distinct tone is determined by performing a search in the captured audio stream for audio data having values that match a distinct set of audio data values determined by the distinct tone. The length of the distinct tone corresponds to the synchronization offset needed to synchronize the audio stream with the video stream. This process is described below in relation to FIG. 8.

Using the synchronization offset, the AV editing application 135 synchronizes (at 430) the audio stream with the video stream to produce an edited audio stream and an edited video stream that are in synchronization with one another. This can be achieved, for example, by altering or adding data to the resource data section 330 of the multiplexed audio and video streams 300.

In one embodiment, data in the resource data section 330 can be altered to indicate to an application receiving the edited audio and video streams that playback of the audio stream is to start at a particular audio data instance (i.e., audio sample) in the audio stream and that all prior audio data instances is to be ignored. The particular audio data instance is determined by the synchronization offset. For example, if the synchronization offset is 320, the data in the resource data section 330 may indicate that playback of the audio stream will begin at the $321^{st}$ audio data instance in the audio stream.

In an alternative embodiment, each audio data instance in the audio stream is re-ordered by subtracting the synchronization offset from an order number of the audio data instance that indicates the position of the audio data instance in the audio stream. For example, if the synchronization offset is 320, the $321^{st}$ audio data instance in the audio stream may be re-ordered to be the $1^{st}$ audio data instance in the audio stream, the $322^{nd}$ audio data instance in the audio stream may be re-ordered to be the $2^{nd}$ audio data instance in the audio stream, etc. Thus, an application receiving the edited audio and video streams would begin playback of the audio stream at the $1^{st}$ audio data instance (previously the $321^{st}$ audio data instance) in the audio stream.

After synchronizing (at 430) the audio stream with the video stream to produce an edited audio stream and an edited video stream, the AV editing application 135 then records (at 435) the edited audio and video streams that will be in synchronization when played back.

Figure 5:
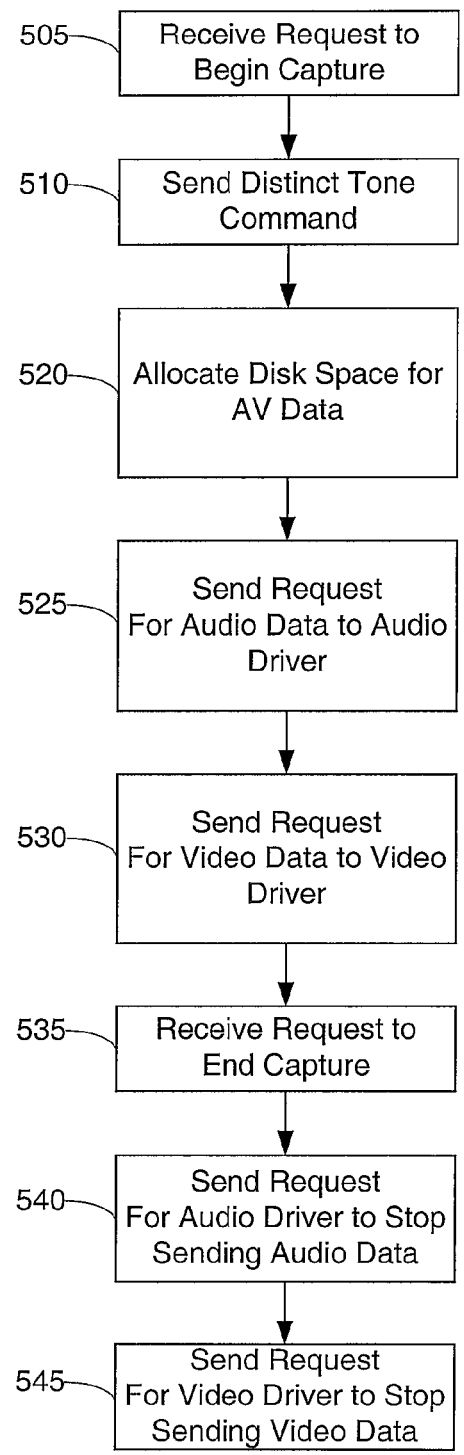
FIG. 5 illustrates a process of an editing application that causes capture of a video stream and an audio stream that includes a distinct tone.

FIG. 5 illustrates a process of the AV editing application 135 that causes capture of a video stream and an audio stream that includes a distinct tone. This process begins when the user initiates (at 410) a capture procedure whereupon the AV editing application 135 receives (at 505) a request to begin capture. The AV editing application 135 sends (at 510) a distinct tone command to the video driver program 125 which, in turn, sends the distinct tone command to the audio driver program 120. In an alternative embodiment, the AV editing application 135 sends the distinct tone command directly to the audio driver program 120.

The distinct tone command is a command requesting a distinct tone having a distinct set of audio data values. For example, the distinct set of audio data values may be a set of values that alternate in gain between +A dB and −A dB, where A is a real number. In one embodiment, the distinct tone contains a distinct set of audio data values that would normally not be present in the AV signals received from the AV source 105 and is unique enough that it is highly unlikely another device would generate it. The distinct tone is generated by the third party card 115, for example, by on-board firmware or logic. In an alternative embodiment, the audio driver program 120 may be configured to produce the distinct tone itself. If neither the third party card 115 nor the audio driver program 120 can respond to the distinct tone command, the distinct tone command will be ignored and capture of the audio and video signals from the AV source 105 will proceed as normal (thus producing captured audio and video streams that are out of synchronization).

The distinct tone command also requires that the distinct tone be sent for capture by the AV capturing application 130 until the video driver program 125 receives a first request for video data (as described below in relation to FIG. 6). When the video driver program 125 receives such, the distinct tone command requires that the distinct tone no longer be sent by the third party card 115 and that the audio and video data of the AV signals from the AV source 105 should be sent from the audio driver program 120 and the video driver program 125, respectively, to be captured as audio and video streams by the AV capturing application 130 (as described below in relation to FIGS. 6 and 7). As such, the next audio data captured after the distinct tone audio data is captured will correspond to the video data of the first video frame of the captured video stream. Therefore, the length of the distinct tone corresponds to a synchronization offset needed to offset the captured audio stream to synchronize it with the captured video stream.

After sending (at 510) the distinct tone command, the AV editing application 135 then allocates (at 520) disk space in the computer 110 to reserve data space for audio and video data to be captured. A request for audio data is then sent (525) to the audio driver program 120 in order for audio data to pass through the audio driver program 120 to the AV capturing application 130. At this time, the third party card 115 is already generating and sending the synch tone to the audio driver program 120 which is then passed onto the AV capturing application 130 for capture in the audio stream. A request for video data is then sent (530) to the video driver program 125 in order for video data to pass through the video driver program 125 to the AV capturing application 130.

The AV editing application 135 receives (at 535) a request to end capture when the user ends (at 420) the capture procedure, for example, by selecting a capture ending option of the AV capturing application 130 or the AV editing application 135 through the GUI. A request is sent (at 540) to the audio driver program 120 to stop sending audio data to the AV capturing application 130 for capture. A request is also sent (at 545) to the video driver program 125 to stop sending video data to the AV capturing application 130 for capture.

Figure 6:
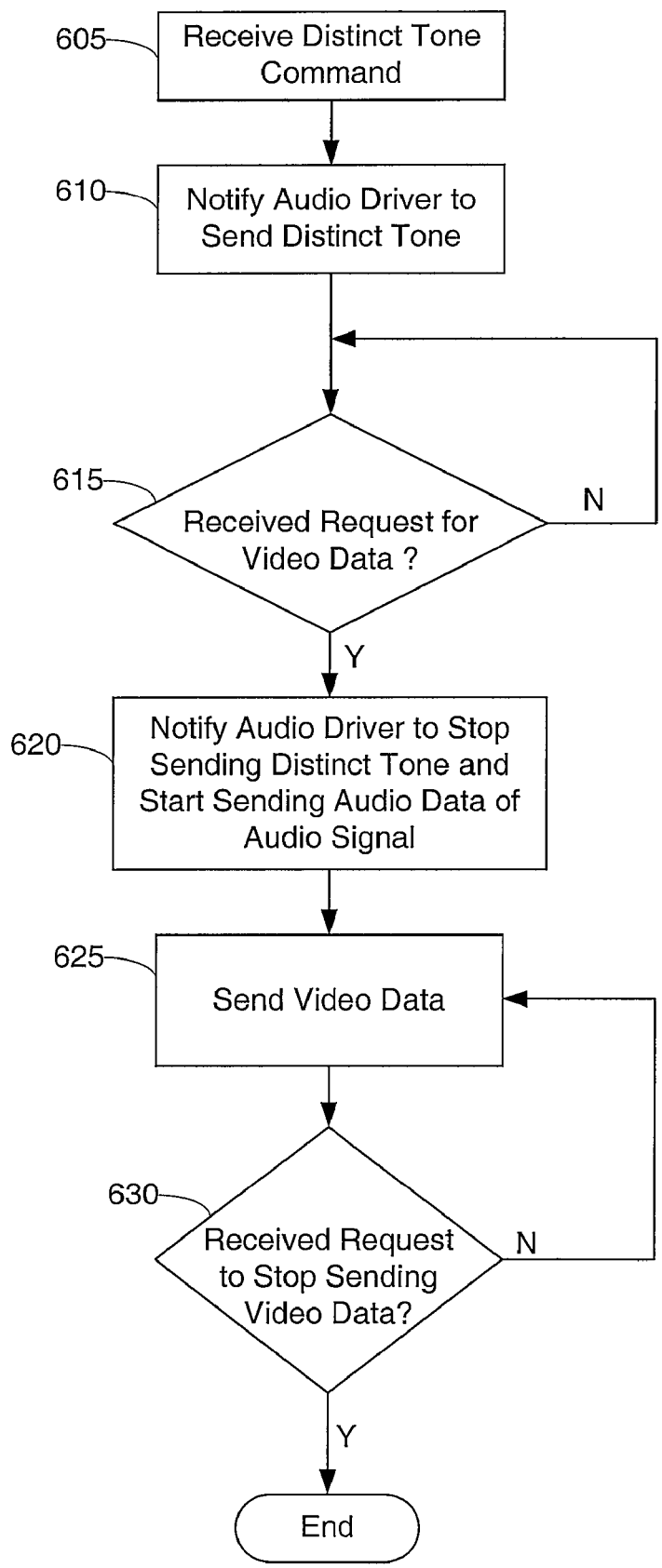
FIG. 6 illustrates a process of a video driver that causes a distinct tone and video data to be sent to a capturing application.

FIG. 6 illustrates a process of the video driver program 125 that causes a distinct tone and video data to be sent to the AV capturing application 130. This process starts when the video driver program 125 receives (at 605) a distinct tone command from the AV editing application 135. Upon receiving the distinct tone command, the video driver program 125 sends the distinct tone command to the audio driver program 120. The distinct tone command notifies (at 610) the audio driver program 120 to send a distinct tone from the third party card 115. In an alternative embodiment, the AV editing application 135 sends the distinct tone command directly to the audio driver program 120. In a further embodiment, the audio driver program 120 generates the distinct tone rather than the third party card 115. The distinct tone command also requires that the distinct tone to be sent by the audio driver program 120 until the video driver program 125 receives a first request for video data. If the video driver program 125 has not received (at 615—No) the first request for video data, the distinct tone will continue to be sent by the audio driver program 120.

When the video driver program 125 receives (at 615—Yes) the first request for video data, the video driver program 125 notifies (at 620) the audio driver program 120 to stop sending the distinct tone and start sending audio data of the audio signal from the AV source 105. The video driver program 125 also sends a request to the third party card 115 to start sending video data from the video signal of the AV source 105 and sends (at 625) the video data to the AV capturing application 130. The video driver program 125 continues to send video data until it has received (at 630—Yes) a request from the AV editing application 135 to stop sending video data to the AV capturing application 130 for capture.

Figure 7:
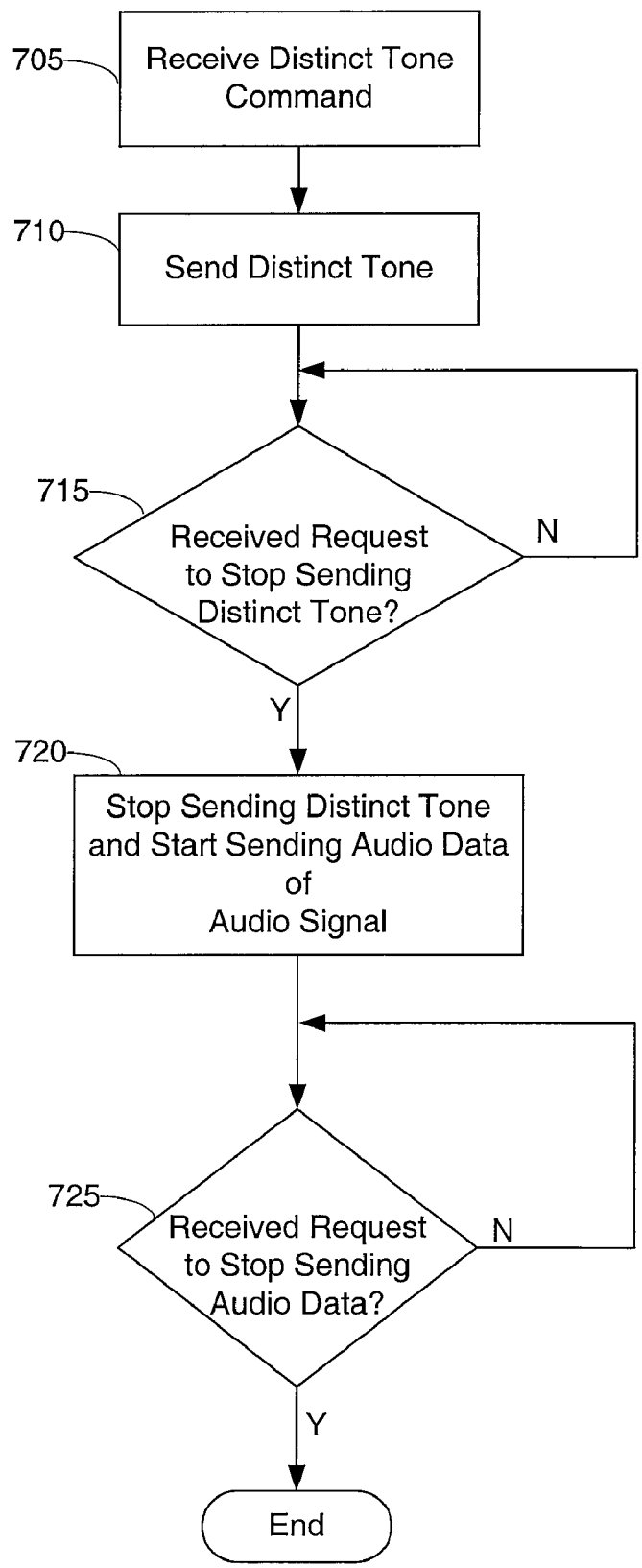
FIG. 7 illustrates a process of an audio driver that causes a distinct tone and audio data to be sent to a capturing application.

FIG. 7 illustrates a process of the audio driver program 120 that causes a distinct tone and audio data to be sent to the AV capturing application 130. This process starts when the audio driver program 120 receives (at 705) a distinct tone command from the video driver program 125, or in an alternative embodiment, from the AV editing application 135. Upon receiving the distinct tone command, the audio driver program 120 requests a distinct tone to be generated and sent from the third party card 115. In a further embodiment, the audio driver program 120 generates the distinct tone rather than the third party card 115. In either case, the audio driver program 120 sends (at 710) the distinct tone to the AV capturing application 130 for capture.

If the audio driver program 120 has not received (at 715—No) a request to stop sending the distinct tone, the audio driver program 120 will continue to send the distinct tone. When the audio driver program 120 receives (at 715—Yes) a request to stop sending the distinct tone, the audio driver program 120 stops (at 720) sending the distinct tone and starts sending audio data of the audio signal from the AV source 105. In order to do so, the audio driver program 120 sends a request to the third party card 115 to stop sending the distinct tone and start sending the audio data of the audio signal of the AV source 105. In an alternative embodiment, the audio driver program 120 is generating the distinct tone itself. Therefore, the audio driver program 120 would stop generating the distinct tone and would send a request to the third party card 115 for audio data of the audio signal from the AV source 105. The audio driver program 120 continues to send audio data to the AV capturing application 130 until it has received (at 725—Yes) a request from the AV editing application 135 to stop sending audio data for capture.

Figure 8:
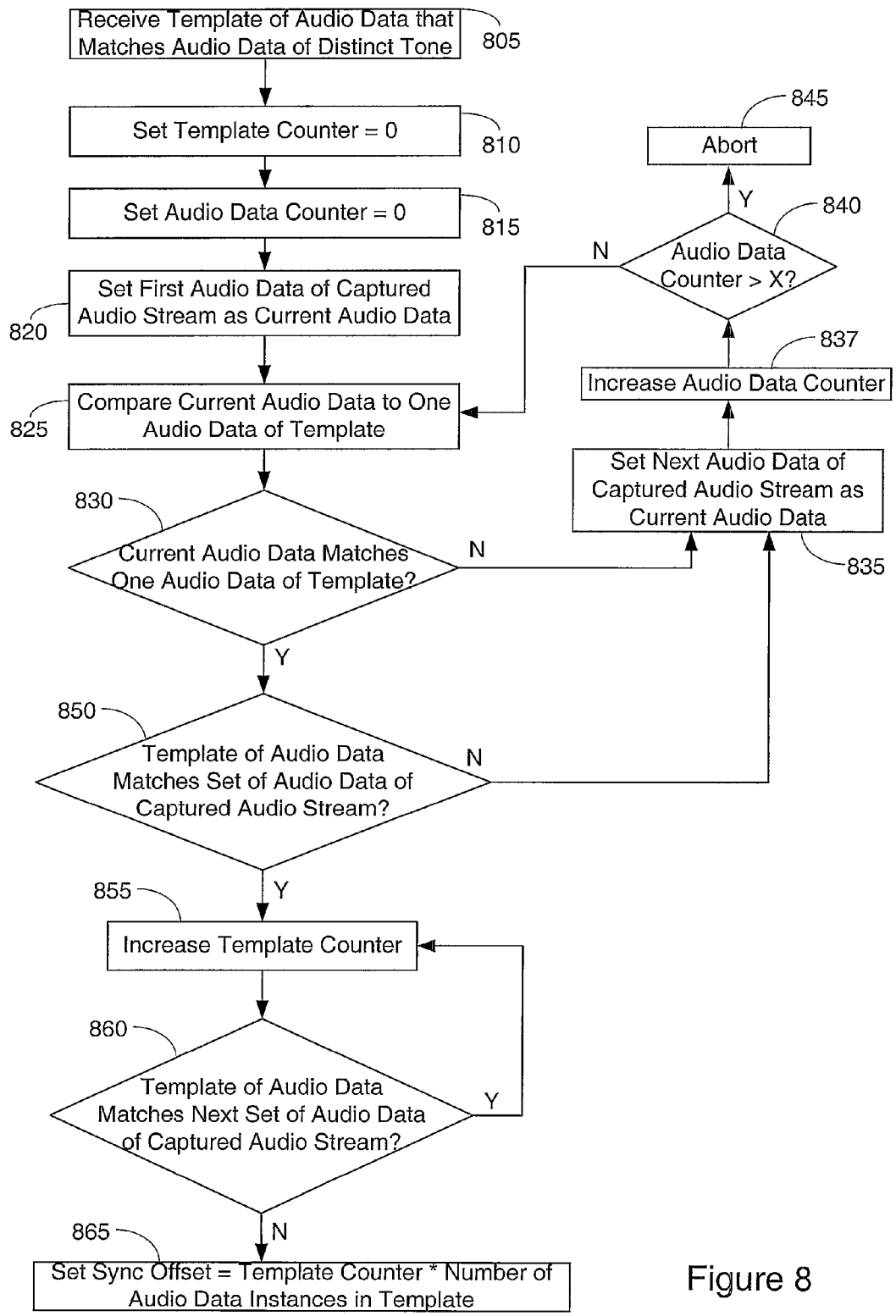
FIG. 8 illustrates a process of an editing application in analyzing a captured audio stream to determine a synchronization offset.

FIG. 8 illustrates a process of the AV editing application 135 in analyzing a captured audio stream to determine a synchronization offset, the captured audio stream being comprised of a series of audio data. The process starts when a template of audio data values that matches the audio data values of the distinct tone is received (at 805). The template of audio data values is a distinct set of audio data values that the process searches a match for in the audio stream. The template has a predetermined number of audio data values (one audio data value for each audio data instance) and may be received from the user or created by the AV editing application 135 itself using the audio data values of the distinct tone. If, for example, the distinct tone has audio data values that alternate between +A dB and −A dB, where A is a real number, the template may, for example, be comprised of four audio data values: +A, −A, +A, and −A.

After receiving the template of audio data values, a template counter is set (at 810) to 0 and an audio data counter is set (at 815) to 0. A first audio data of a captured audio stream is then set (at 820) as a current audio data. In an alternative embodiment, any other audio data of the captured audio stream is set (at 820) as the current audio data. The value of the current audio data is compared (at 825) to a first audio data value in the template of audio data values. In an alternative embodiment, the current audio data value is compared (at 825) to any other audio data value in the template of audio data values.

If the current audio data value does not match (at 830—No) the first audio data value in the template of audio data values, the next audio data in the series of audio data of the captured audio stream is set (at 835) as the current audio data and the audio data counter is increased (at 837). The audio data counter is then checked (at 840) to determine if it is greater than X, X being a predetermined integer value. For example, X may be set to equal the number of audio data instances (i.e., audio samples) corresponding to 1 second of audio data in the captured audio stream, the actual value of X depending on the sampling rate of the audio stream. If it is determined (at 840—Yes) that the audio data counter is greater than X, the process is aborted (at 845). Otherwise, the process continues and the value of the current audio data is compared (at 825) to the first audio data value in the template of audio data values.

If the current audio data value matches (at 830—Yes) the first audio data value in the template of audio data values, the entire template of audio data values is then compared (at 850) to a correlating set of audio data values in the captured audio stream. For example, if the current audio data value matches the first audio data value in the template of audio data values and the template of audio data values is comprised of 4 audio data values, the set of audio data values in the captured audio stream would be comprised of the current audio data value and the next 3 audio data values in the captured audio stream. If the template of audio data values does not match (at 850—No) the correlating set of audio data values in the captured audio stream, the process continues at 835.

If the template of audio data values matches (at 850—Yes) the correlating set of audio data values in the captured audio stream, the template counter is increased (at 855). The template of audio data values is then compared (at 860) to a next set of audio data values of the captured audio stream. In the example given above, the next set of audio data values would be comprised of the next 4 audio data values in the captured audio stream. If the template of audio data values matches (at 860—Yes) the next set of audio data values of the captured audio stream, the template counter is increased (at 855).

If the template of audio data values does not match (at 860—No) the next set of audio data values of the captured audio stream, the synchronization offset is set (at 865) to equal the template counter times the number of audio data values in the template of audio data values. In the example given above, if 3 sets of audio data values of the captured audio stream match the template of audio data values, the template counter equals 3 and the synchronization offset equals 3*4 or 12. Thus, the synchronization offset is approximately equal to the number of audio data instances (i.e., audio samples) in the captured audio stream that matches the audio data of the distinct tone.

Figure 9:
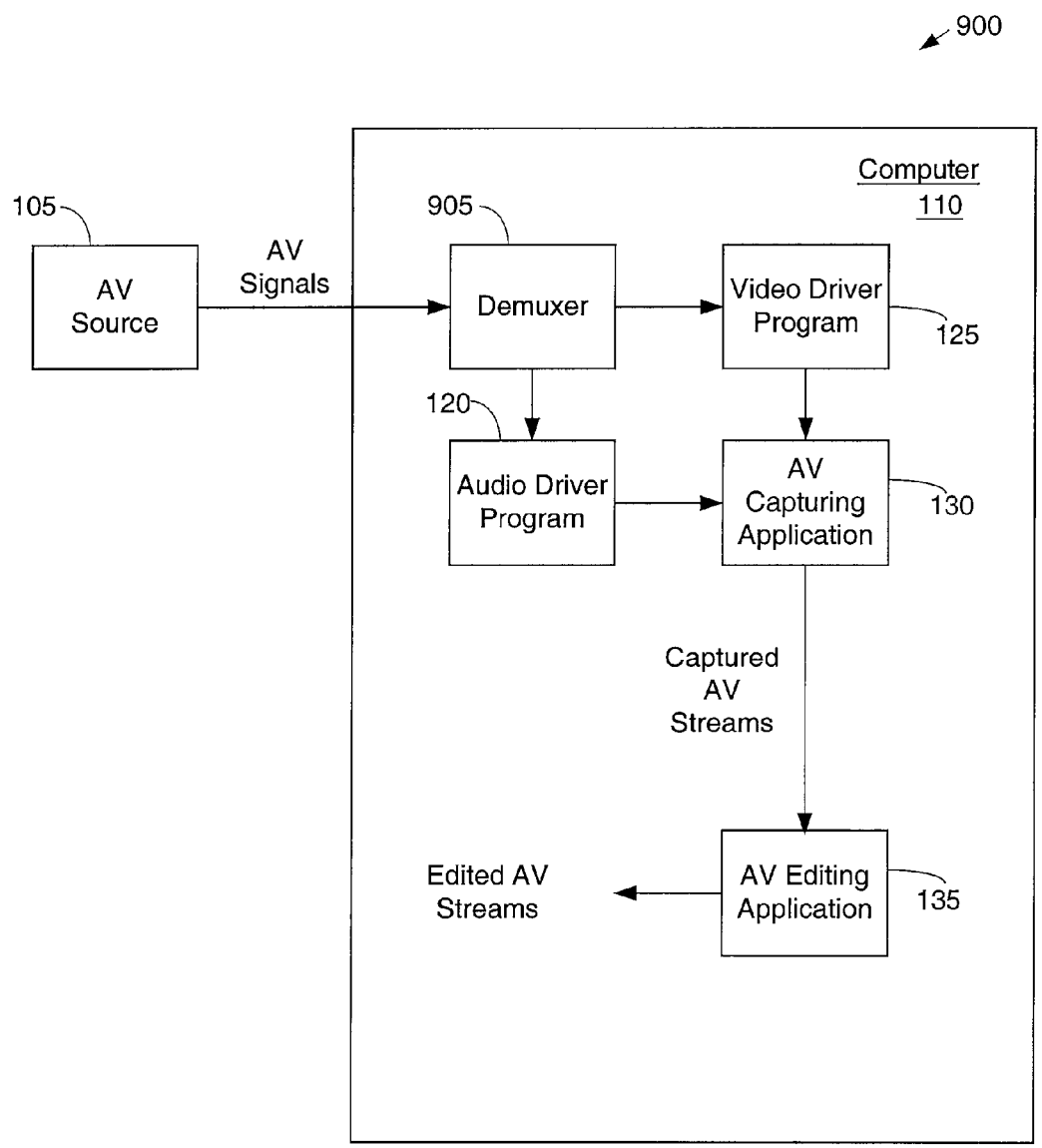
FIG. 9 illustrates a conceptual diagram of an alternative environment where some embodiments of the invention are implemented.

II. FIG. 9 illustrates a conceptual diagram of an alternative environment 900 where some embodiments of the invention are implemented. The environment 900 includes elements similar to the elements shown in the environment 100 of FIG. 1. Only those aspects of the environment 900 differing from the environment 100 of FIG. 1 will be described in detail here.

As shown in FIG. 9, the computer 110 contains a demultiplexer 905 (rather than a third party card 115 of the environment 100 of FIG. 1). The demultiplexer 905 receives multiplexed AV signals (e.g., through a serial digital port) from the AV source 105. The AV source 105 can be any source providing multiplexed AV signals such as a standard consumer DV, DV camera, DV video deck, etc.

After receiving the multiplexed AV signals, the demultiplexer 905 then extracts and copies the audio signal portion of the multiplexed AV signals to produce an audio only signal that is sent to the audio driver program 120. The demultiplexer 905 also sends a mixed video signal to the video driver program 125, the mixed video signal being a duplicate of the multiplexed AV signals received from the AV source 105.

Typically, the multiplexed AV signals have a synchronous relationship when received by the demultiplexer 905. When, however, the audio only signal is sent to the audio driver program 120 and the mixed video signal is sent to the video driver program 125, there is no synchronous relationship between the audio only signal and the mixed video signal even though the audio only signal is a duplicate of an audio signal portion embedded in the mixed video signal.

After the demultiplexer 905, the audio only signal is processed by the audio driver program 120 and the mixed video signal is processed by the video driver program 125. The audio driver program 120 passes the audio only signal to the AV capturing application 130 which captures the audio only signal as an audio stream. The captured audio stream contains a series of audio data (each instance of audio data being referred to as an audio sample). The video driver program 125 passes the mixed video signal to the AV capturing application 130 which captures the video signal as a video stream. The captured video stream is comprised of a series of audio samples and a series of video frames each containing a series of video data. In the prior art, since there is no synchronous relationship between the audio only signal and the mixed video signal, the captured audio and video streams will also be non-synchronous.

In some embodiments of the invention, the AV editing application 135 extracts audio data from the video stream corresponding to a predetermined video frame in the video stream. The AV editing application 135 then performs a search in the audio stream for audio data matching the extracted audio data and determines a total number of prior audio data instances (i.e., audio samples) occurring before the matching audio data in the audio stream. The total number of prior audio data instances (i.e., audio samples) is set as a synchronization offset. The AV editing application 135 offsets the audio stream by the synchronization offset to synchronize the audio stream with the video stream and produce an edited audio stream and an edited video stream that are in synchronization with one another.

In further embodiments of the invention, the AV editing application 135 analyzes the captured video stream to determine a calculated sampling rate of the audio data embedded in the video stream. The AV editing application 135 then modifies the sampling rate associated with the captured audio stream to match the calculated sampling rate. These processes ensure that the sampling rate associated with the audio data in the audio stream matches the sampling rate of the audio data embedded in the video stream.

Figure 10:
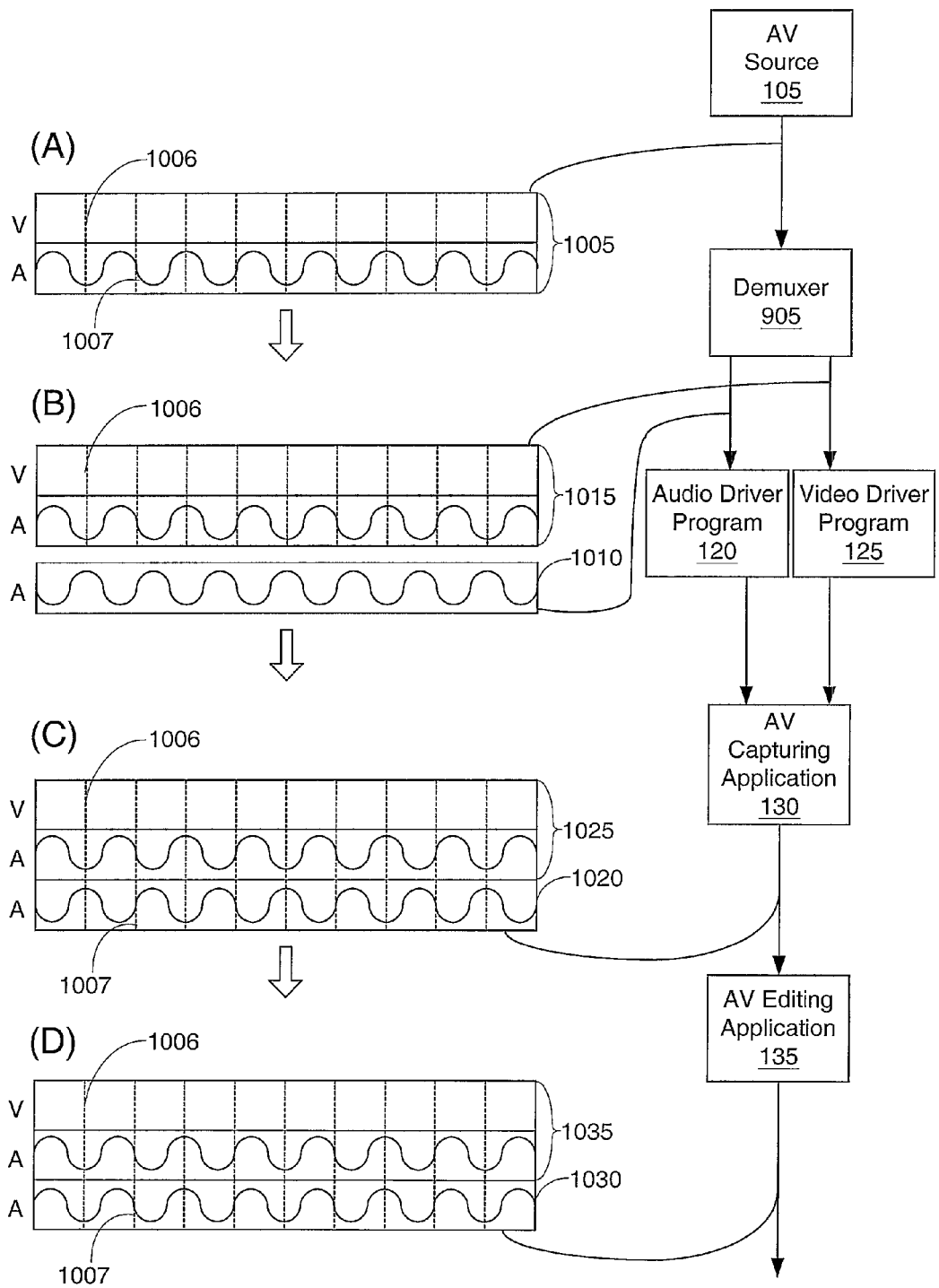
FIG. 10 illustrates conceptual diagrams of audio and video signals as they are processed in the alternative environment shown in FIG. 9.

FIG. 10 parts A through D illustrate conceptual diagrams of audio and video signals as they are processed in the alternative environment 900 shown in FIG. 9. Part A of FIG. 10 shows multiplexed audio and video signals (AV signals) 1005 that are sent by the AV source 105 to the demultiplexer 905. The video signal portion of the multiplexed AV signals 1005 is comprised of a series of video frames, each video frame being separated by a video frame boundary 1006 and containing a series of video data. The audio signal portion of the multiplexed AV signals 1005 is comprised of a series of audio frames, each audio frame being separated by an audio frame boundary 1007 and containing a series of audio data. Each video frame in the video signal portion has a coinciding audio frame in the audio signal portion that contains the audio data for the video frame. So typically, between the multiplexed AV signals 1005 received by the demultiplexer 905, there is a synchronous relationship between each video frame boundary 1006 of the video signal and an audio frame of the audio signal.

The demultiplexer 905 receives the multiplexed AV signals 1005 and extracts and sends an audio only signal 1010 to the audio driver program 120 and sends a mixed video signal 1015 to the video driver program 125 (as shown in Part B of FIG. 10). The mixed video signal 1015 is a duplicate of the multiplexed AV signals 1005 show in Part A. As described above, there is no synchronous relationship between the audio only signal 1010 and the mixed video signal 1015, so that a video frame boundary 1006 of the mixed video signal 1015 has no synchronous relationship to an audio frame of the audio only signal 1010.

The AV capturing application 130 receives the audio only signal 1010 from the audio driver program 120. From the received audio only signal 1010, the AV capturing application 130 produces a captured audio stream 1020 (shown in Part C of FIG. 10). The AV capturing application 130 also receives the mixed video signal 1015 from the video driver program 125. From the received mixed video signal 1015, the AV capturing application 130 produces a captured video stream 1025 (shown in Part C of FIG. 10) that contains audio data that are duplicates of at least some of the audio data comprising the audio stream 1020.

In accordance with processes of the present invention, AV editing application 135 analyzes the captured audio stream 1020 and the captured video stream 1025 to determine a synchronization offset. The AV editing application 135 uses the synchronization offset to synchronize the captured audio stream 1020 with the captured video stream 1025 to produce an edited audio stream 1030 and an edited video stream 1035 (shown in part D of FIG. 10) that are in synchronization with one another.

Figure 11:
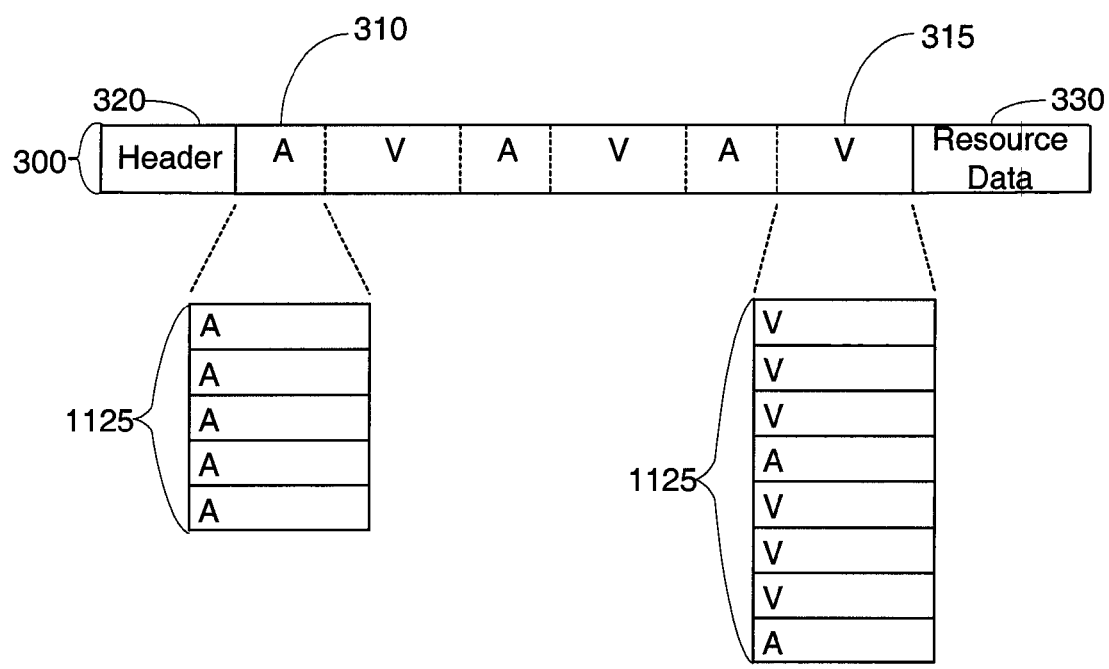
FIG. 11 illustrates a diagram of an audio data packet and a video data packet of multiplexed audio and video streams.

Typically, the AV capturing application 130 and the AV editing application 135 multiplex audio and video streams into one data stream. FIG. 11 illustrates a diagram of an audio data packet 310 and a video data packet 315 of multiplexed audio and video streams 300 that form one data stream. The elements of FIG. 11 are similar to the elements of FIG. 3 except that a body section 1125 of each video data packet 315 contains audio and video data at a predetermined ratio. This is due to the fact that the video stream 1025 and the edited video stream 1035 have embedded audio data that has been captured from the mixed video signal 1015. The body section 1125 contains audio and video data at a predetermined ratio of audio data to video data. In the example shown in FIG. 11, this ratio is 1 to 3.

Figure 12:
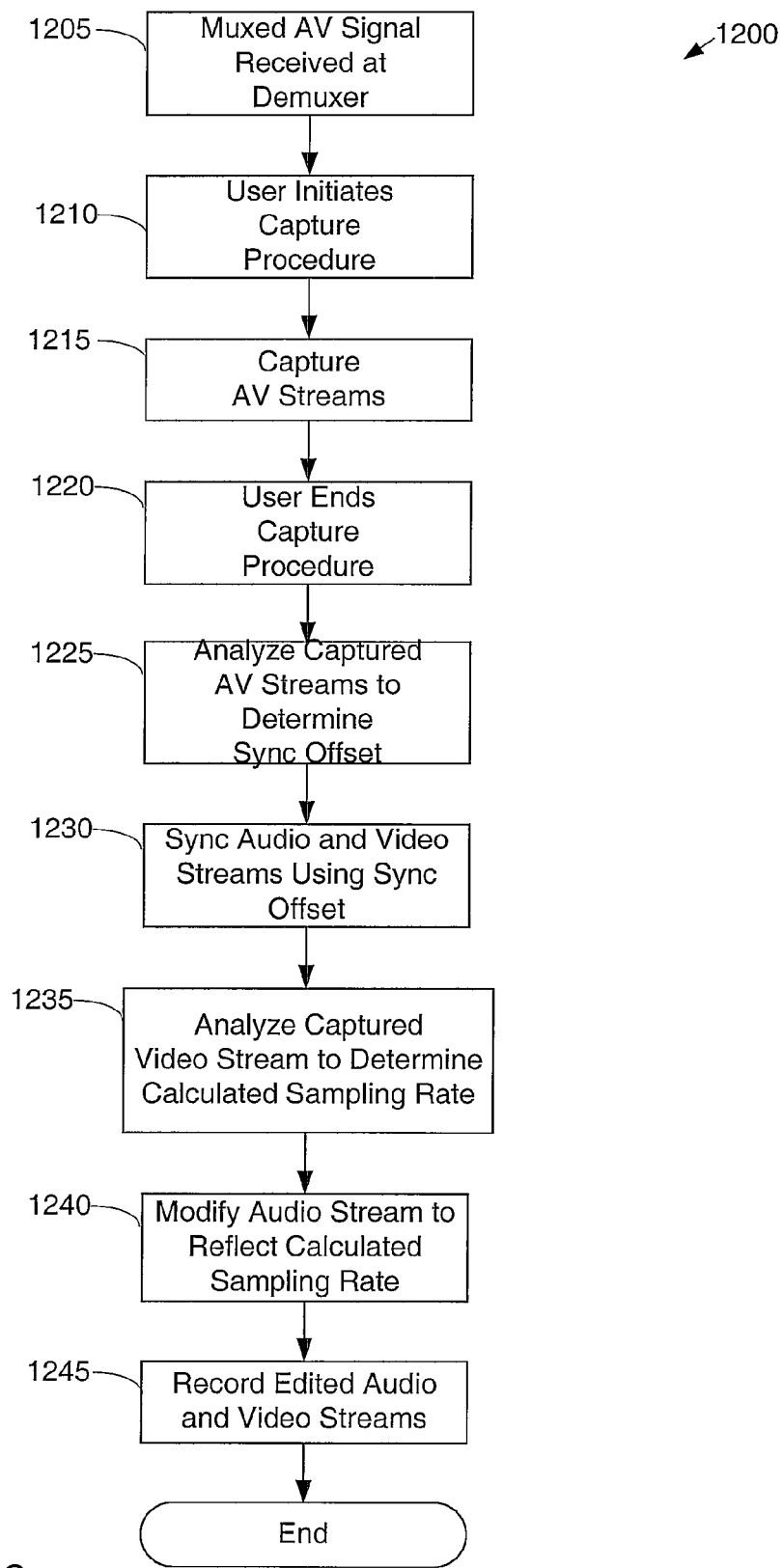
FIG. 12 illustrates an alternative general process for synchronizing captured audio and video streams.

FIG. 12 illustrates an alternative general process 1200 performed by components of the computer 110 for synchronizing captured audio and video streams. Initially, multiplexed AV signals are received (at 1205) by the demultiplexer 905 from the AV source 105. A user initiates (at 1210) a capture procedure of the AV capturing application 130. The AV capturing application 130 receives and captures (at 1215) an audio only signal and a mixed video signal from the demultiplexer 905 to produce captured audio and video streams, respectively. The captured video stream is comprised of a series of video frames each containing a series of video data and a series of audio samples. The captured audio stream is comprised of a series of audio frames each containing a series of audio samples, the captured audio stream having an associated sampling rate. The user then ends (at 1220) the capture procedure of the AV editing application 135.

The AV editing application 135 then receives the captured audio and video streams from the AV capturing application 130 and analyzes (at 1225) the captured audio and video streams to determine a synchronization offset. The synchronization offset is determined by performing a search in the captured audio stream for audio data having values that match a distinct set of audio data values determined by audio data embedded in the video stream. This process is described below in relation to FIG. 13.

Using the synchronization offset, the AV editing application 135 synchronizes (at 1230) the audio stream with the video stream. This can be achieved, for example, by altering or adding data to the resource data section 330 of the multiplexed audio and video streams 300, as discussed above in relation to step 430 of FIG. 4.

The AV editing application 135 then analyzes (at 1235) the captured video stream to determine a calculated sampling rate of the audio data embedded in the video stream. This process is described below in relation to FIG. 14. The AV editing application 135 modifies (at 1240) the sampling rate associated with the captured audio stream to match the calculated sampling rate. This can be achieved, for example, by altering data in the resource data section 330 in the multiplexed audio and video streams 300 to indicate the calculated sampling rate as the sampling rate of the captured audio stream 1020. In an alternative embodiment, the AV editing application 135 re-samples the audio stream at the calculated sampling rate. The AV editing application 135 then records (at 1245) the edited audio and video streams that will be in synchronization when played back.

Figure 13:
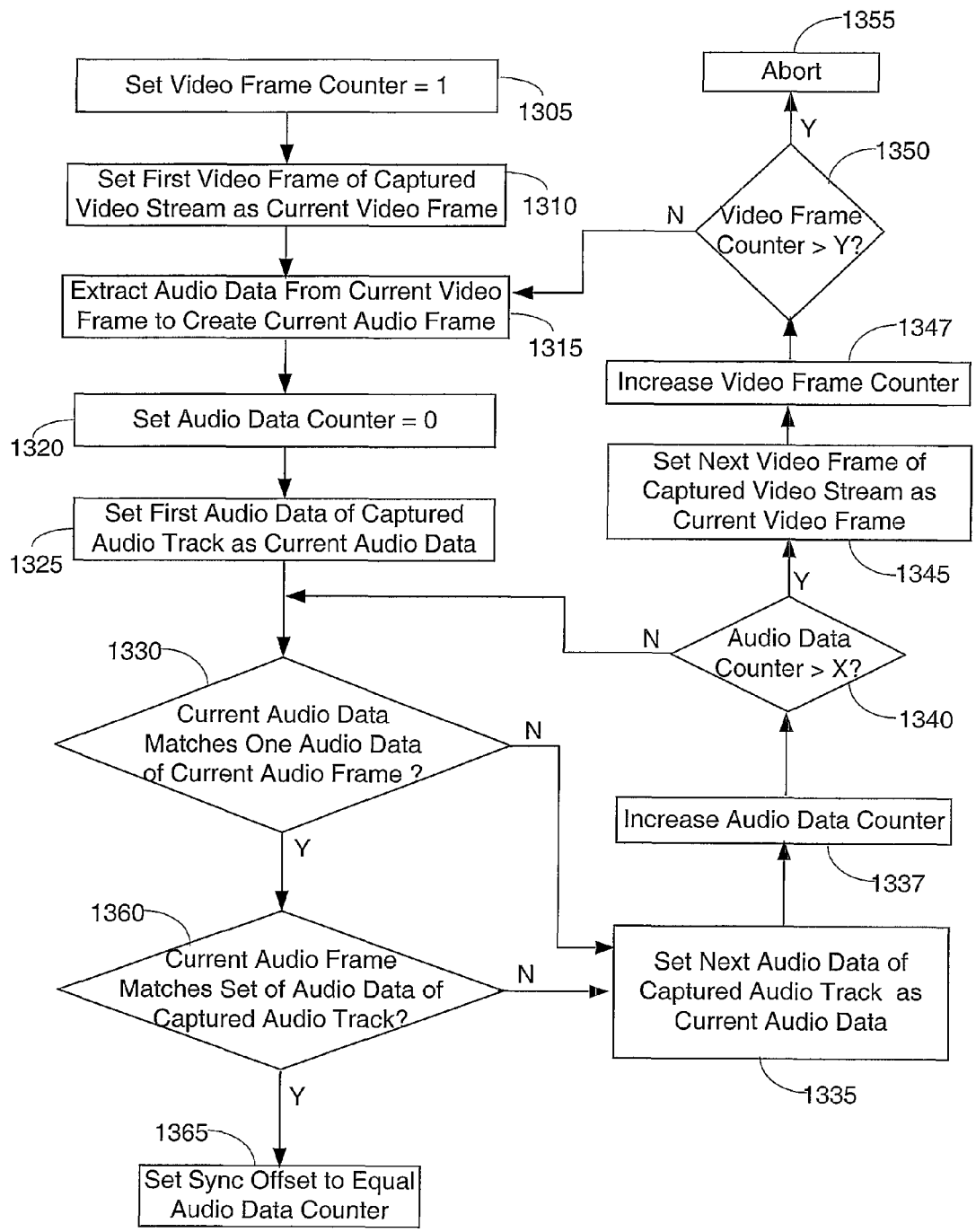
FIG. 13 illustrates a process of the AV editing application in analyzing captured audio and video streams to determine a synchronization offset.

FIG. 13 illustrates a process of the AV editing application 135 in analyzing captured audio and video streams to determine a synchronization offset. The captured audio stream is comprised of a series of audio samples and the captured video stream is comprised of a series of video frames each containing a series of video data and a series of audio samples. The captured video stream contains audio samples that are duplicates of at least some of the audio samples comprising the captured audio stream.

Initially, a video frame counter is set (at 1305) to 1. A first video frame of the captured video stream is then set (at 1310) as a current video frame. In an alternative embodiment, any other first video frame of the captured video stream is set (at 1310) as the current video frame. Audio data is then extracted (at 1315) from the current video frame. The value of each instance of audio data (i.e., audio sample) in the current video frame is used to create a current audio frame of audio data values. The current audio frame of audio data values is a distinct set of audio data values that the process searches a match for in the audio stream.

An audio data counter is then set (at 1320) to 0. A first audio data of the captured audio stream is set (at 1325) as a current audio data. In an alternative embodiment, any other audio data of the captured audio stream is set (at 1325) as the current audio data. The value of the current audio data is then compared (at 1330) to a first audio data value in the audio frame of audio data values. In an alternative embodiment, the current audio data value is compared (at 1330) to any other audio data value in the audio frame of audio data values.

If the current audio data value does not match (at 1330—No) the first audio data value in the audio frame of audio data values, the next audio data in the series of audio data of the captured audio stream is set (at 1335) as the current audio data and the audio data counter is increased (at 1337). The audio data counter is then checked (at 1340) to determine if it is greater than X, X being a predetermined integer value. For example, X may be set to equal the number of audio data instances (i.e., audio samples) corresponding to 1 second of audio data in the captured audio stream, the actual value of X depending on the sampling rate of the captured audio stream. If it is determined (at 1340—No) that the audio data counter is not greater than X, the value of the current audio data is compared (at 1330) to the first audio data value in the audio frame of audio data values.

If it is determined (at 1340—Yes) that the audio data counter is greater than X, the next video frame in the series of video frames of the captured video stream is set (at 1345) as the current video frame and the vide frame counter is increased (at 1347). The video frame counter is then checked (at 1350) to determine if it is greater than Y, Y being a predetermined integer value. For example, Y may be set to equal the number of video frames corresponding to 1 second of video frames in the captured video stream, the actual value of Y depending on the frame rate of the captured video stream. If it is determined (at 1350—Yes) that the video frame counter is greater than Y, the process is aborted (at 1355). Otherwise, the process continues and audio data is extracted (at 1315) from the current video frame to create a current audio frame of audio data values.

If the current audio data value matches (at 1330—Yes) the first audio data value in the audio frame of audio data values, the entire audio frame of audio data values is then compared (at 1360) to a correlating set of audio data values in the captured audio stream. For example, if the current audio data value matches the first audio data value in the audio frame of audio data values and the audio frame of audio data values is comprised of 25 audio data values, the set of audio data values in the captured audio stream would be comprised of the current audio data value and the next 24 audio data values in the captured audio stream. If the audio frame of audio data values does not match (at 850—No) the correlating set of audio data values in the captured audio stream, the process continues at 1335.

If the audio frame of audio data values matches (at 1360—Yes) the correlating set of audio data values in the captured audio stream, the synchronization offset is set (at 1365) to equal the audio data counter. Thus, the synchronization offset is equal to a total number of prior audio data instances (i.e., audio samples) in the audio stream that occur prior to the set of audio data in the audio stream having values that match the audio frame of audio data values. The matching set of audio data in the audio stream is the corresponding audio data for a particular video frame in the video stream that is identified by the video frame counter.

Therefore, the matching set of audio data in the audio stream should be synchronized with the particular video frame identified by the video frame counter. This can be achieved, for example, by altering or adding data to the resource data section 330 of the multiplexed audio and video streams 300, as discussed above in relation to step 430 of FIG. 4. If the video frame counter identifies the first video frame in the video stream, then the modifications to data in the resource data section 330 need only affect the audio stream.

If, however, the video frame counter identifies a video frame other than the 1$^{st}$ video frame in the video stream, the video stream must be offset as well. This can be achieved using the same techniques discussed above in relation to step 430 of FIG. 4. For example, data in the resource data section 330 can be altered to indicate to an application receiving the edited audio and video streams that playback of the video stream is to start at a particular video frame in the video stream and that all prior video frames are to be ignored. The particular video frame is determined by the video frame counter. For example, if the video frame counter is 20, the data in the resource data section 330 may indicate that playback of the video stream will begin at the 21$^{st}$ video frame in the video stream.

Figure 14:
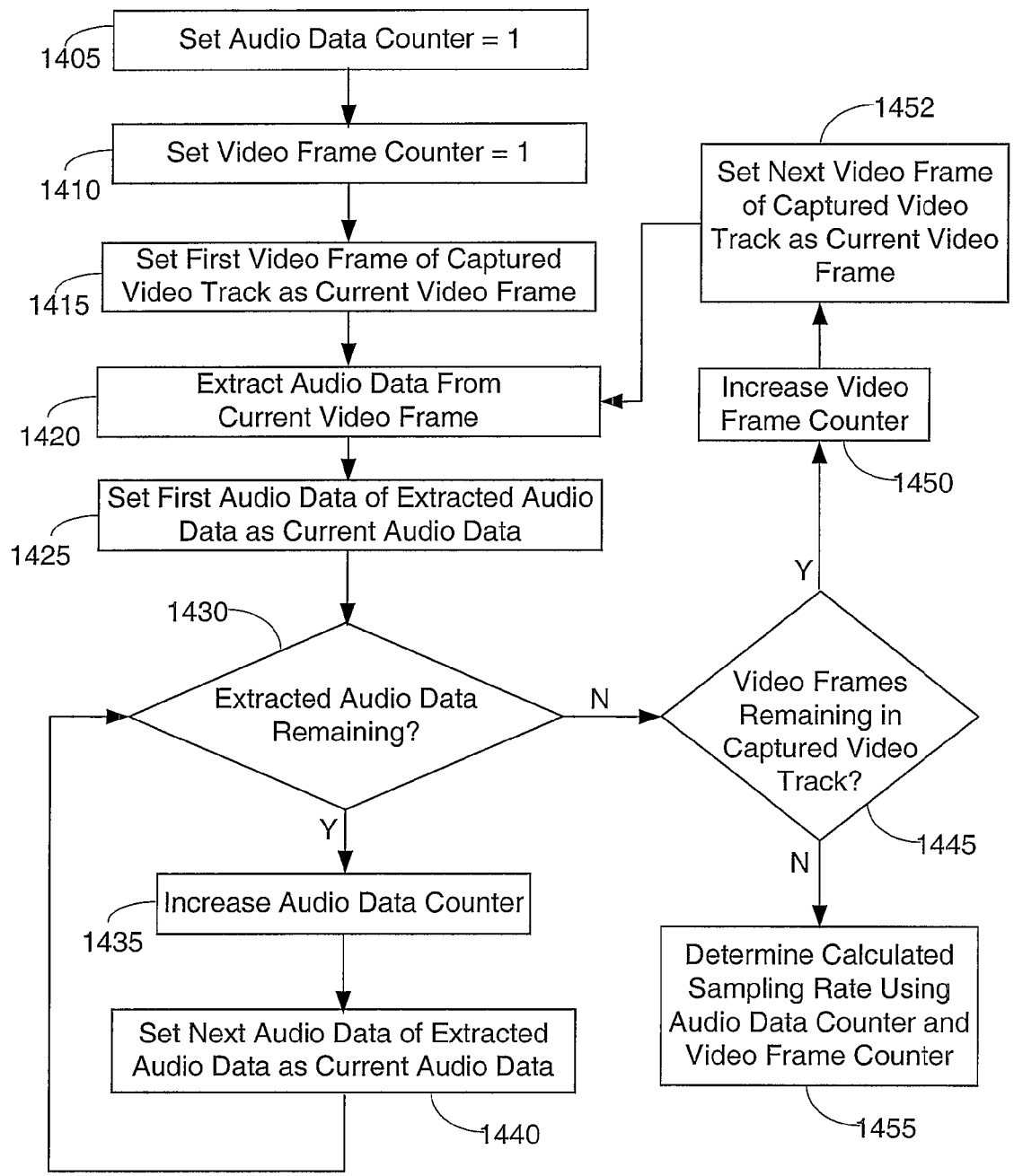
FIG. 14 illustrates a process of the AV editing application in analyzing a captured video stream to determine a calculated sampling rate.

FIG. 14 illustrates a process of the AV editing application 135 in analyzing a captured video stream to determine a calculated sampling rate. The captured video stream is comprised of a series of video frames each containing a series of video data and a series of audio data.

Initially, an audio data counter is set (at 1405) to 1 and a video frame counter is set (at 1410) to 1. A first video frame of the captured video stream is then set (at 1415) as a current video frame. In an alternative embodiment, any other first video frame of the captured video stream is set (at 1415) as the current video frame. Audio data is then extracted (at 1420) from the current video frame. A first audio data (i.e., a first audio sample) of the extracted audio data is then set (at 1425) as a current audio data. It is then checked (at 1430) to determine if there is more extracted audio data. If so, the audio data counter is increased (at 1435) and the next audio data (i.e., next audio sample) of the extracted audio data is set (at 1440) as the current audio data.

If it is determined (at 1430—No) that there is no more extracted audio data, it is checked (at 1445) if there are video frames remaining in the captured video stream. If so, the video frame counter is increased (at 1450) and the next video frame of the captured video stream is set (at 1452) as the current video frame.

If it is determined (at 1445—No) that there are no more video frames remaining in the captured video stream, a calculated sampling rate of the audio data in the video stream is determined (at 1455) using the audio data counter (the total number of audio samples in the video stream) and the video frame counter (the total number of video frames in the video stream). For example, the calculated sampling rate can be determined by the following equation:

(total number of audio samples/total number of video frames)*a predetermined frame rate of the video stream.

To illustrate, if the total number of audio samples is equal to A, the total number of video frames is equal to B, and the predetermined frame rate of the video stream is equal to 30 frames per second, then the calculated sampling rate is equal to (A/B*30) audio samples per second.

Figure 15:
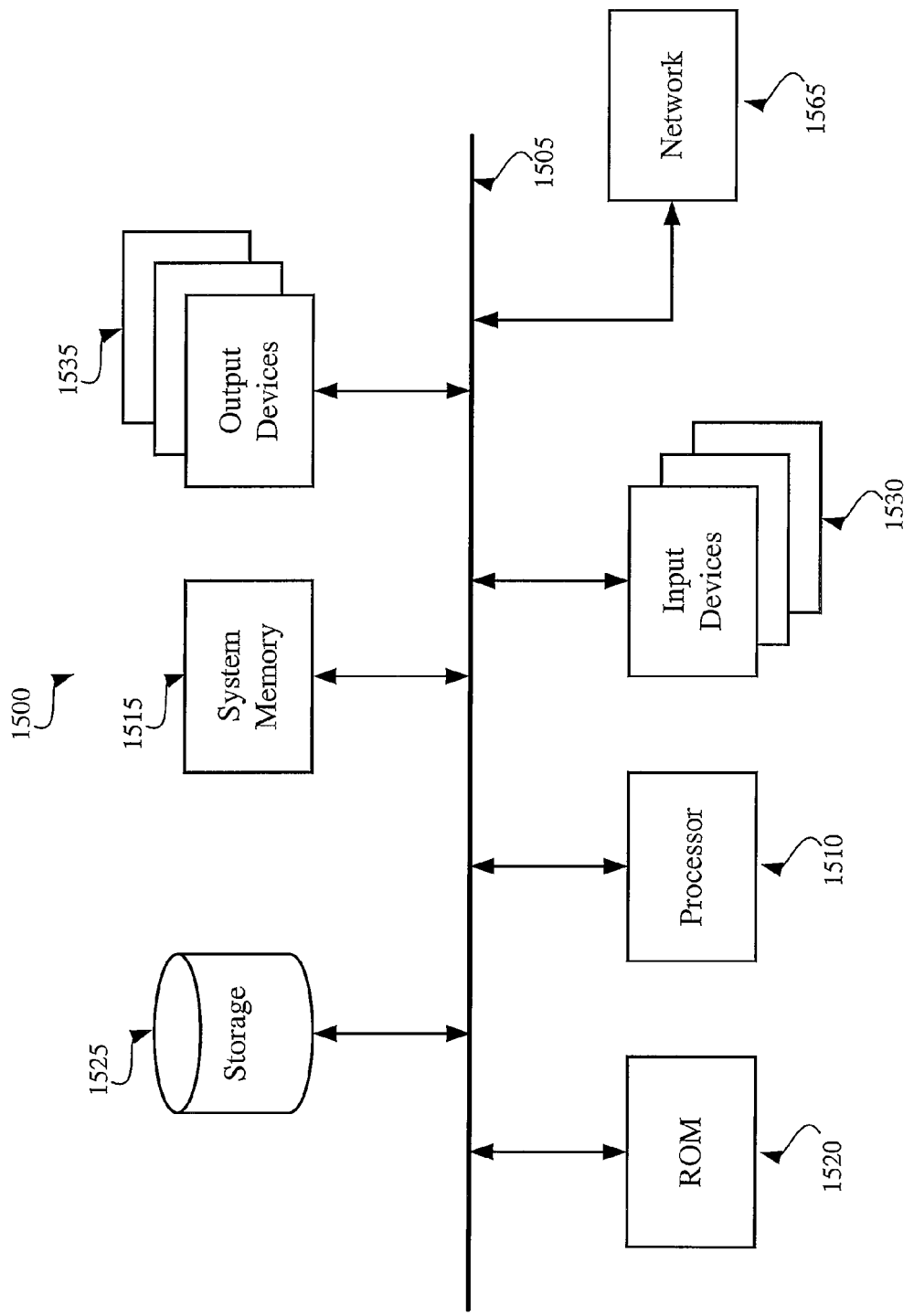
FIG. 15 presents a computer system with which some embodiments of the invention are implemented.

FIG. 15 presents a computer system with which some embodiments of the invention are implemented. Computer system 1500 includes a bus 1505, a processor 1510, a system memory 1515, a read-only memory 1520, a permanent storage device 1525, input devices 1530, and output devices 1535.

The bus 1505 collectively represents all system, peripheral, and chipset buses that communicatively connect the numerous internal devices of the computer system 1500. For instance, the bus 1505 communicatively connects the processor 1510 with the read-only memory 1520, the system memory 1515, and the permanent storage device 1525.

The read-only-memory (ROM) 1520 stores static data and instructions that are needed by the processor 1510 and other modules of the computer system. The permanent storage device 1525, on the other hand, is read-and-write memory device. This device is a non-volatile memory unit that stores instruction and data even when the computer system 1500 is off. Some embodiments of the invention use a mass-storage device (such as a magnetic or optical disk and its corresponding disk drive) as the permanent storage device 1525. Other embodiments use a removable storage device (such as a floppy disk or Zip® disk, and its corresponding disk drive) as the permanent storage device. The permanent storage device may contain, for example, instructions of applications such as the AV capturing application 130 or the AV editing application 135 and data for captured audio and video streams.

Like the permanent storage device 1525, the system memory 1515 is a read-and-write memory device. However, unlike storage device 1525, the system memory is a volatile read-and-write memory, such as a random access memory (RAM). The system memory stores some of the instructions and data that the processor needs at runtime. In some embodiments, the invention's processes are stored in the system memory 1515, the permanent storage device 1525, and/or the read-only memory 1520.

Various embodiments of the invention may be implemented using the permanent storage device 1525 or the system memory 1515. For example, analysis of audio and video data of captured audio and video streams (as described above in relation to FIGS. 8, 13, and 14) may be performed after such audio and video data have been written to the permanent storage device 1525. Alternatively, such audio and video data may be more efficiently analyzed while still in the system memory 1515 during capture by the AV capturing application 130.

From these various memory units, the processor 1510 retrieves instructions to execute and data to process in order to execute the processes of the invention. For example, the processor 1510 may retrieve and execute instructions of the AV capturing application 130 or the AV editing application 135.

The bus 1505 also connects to the input and output devices 1530 and 1535. The input devices enable the user to communicate information and select commands to the computer system. The input devices 1530 include alphanumeric keyboards and cursor-controllers. The output devices 1535 display images generated by the computer system. For instance, these devices display IC design layouts. The output devices include printers and display devices, such as cathode ray tubes (CRT) or liquid crystal displays (LCD).

Finally, as shown in FIG. 15, bus 1505 also couples computer 1500 to a network 1565 through a network adapter (not shown). In this manner, the computer can be a part of a network of computers (such as a local area network ("LAN"), a wide area network ("WAN"), or an Intranet) or a network of networks (such as the Internet). Any or all of the components of computer system 1500 may be used in conjunction with the invention. However, one of ordinary skill in the art would appreciate that any other system configuration may also be used in conjunction with the present invention.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

I claim:

1. A method of processing media data, the method comprising:
   receiving an audio stream comprising a series of audio data;
   receiving a video stream comprising a series of video frames and a set of audio data; and
   synchronizing the audio stream with the video stream based on the set of audio data in the video stream by (i) determining a calculated sampling rate based on the set of audio data in the video stream and (ii) resampling the audio stream at the calculated sampling rate.

2. The method of claim 1 further comprising multiplexing the audio stream and the video stream into a multiplexed media stream.

3. The method of claim 1, wherein synchronizing the audio stream with the video stream comprises utilizing at least one counter for counting the set of audio data in the video stream.

4. The method of claim 1, wherein synchronizing the audio stream with the video stream comprises calculating a time duration corresponding to the set of audio data in the video stream.

5. The method of claim 1, wherein synchronizing the audio stream with the video stream comprises calculating a total number of audio data in the audio stream that matches the set of audio data in the video stream.

6. A computer readable medium storing a computer program which when executed by at least one processor processes media data, the computer program comprising sets of instructions for:
   receiving an audio stream comprising a series of audio data;
   receiving a video stream comprising a series of video frames and a set of audio data; and
   synchronizing the audio stream with the video stream based on the set of audio data in the video stream by (i) determining a calculated sampling rate based on the set of audio data in the video stream and (ii) resampling the audio stream at the calculated sampling rate.

7. The computer readable medium of claim 6, wherein the set of audio data in the video stream are duplicates of at least some of the audio data in the audio stream.

8. The computer readable medium of claim 6, wherein the set of instructions for synchronizing the audio stream with the video stream comprises a set of instructions for utilizing at least one counter for counting the set of audio data in the video stream.

9. The computer readable medium of claim 6, wherein the computer program further comprises a set of instructions for recording the synchronized audio stream and video stream for synchronized playback.

10. The computer readable medium of claim 6, wherein the computer program further comprises a set of instructions for multiplexing the audio and video streams into a multiplexed media data.

11. The computer readable medium of claim 10, wherein the multiplexed media data comprises:
    a self-describing section; and
    a plurality of interleaved audio and video data.

12. The computer readable medium of claim 11, wherein the set of instructions for synchronizing the audio stream with the video stream comprises a set of instructions for utilizing the self-describing section of the multiplexed media data.

13. The computer readable medium of claim 11, wherein the set of instructions for synchronizing the audio stream with the video stream comprises a set of instructions for indicating the calculated sampling rate in the self-describing section of the multiplexed media data.

14. The computer readable medium of claim 6, wherein the computer program further comprises a set of instructions for receiving a request to begin capture of the media data.

15. The computer readable medium of claim 14, wherein the request to begin capture is received through a user interface of an application program.

16. The computer readable medium of claim 6, wherein the set of instructions for synchronizing the audio stream with the video stream comprises a set of instructions for calculating a time duration corresponding to the set of audio data in the video stream.

17. The computer readable medium of claim 6, wherein the set of instructions for synchronizing the audio stream with the video stream comprises a set of instructions for calculating a total number of audio data in the audio stream that matches the set of audio data in the video stream.

18. A system comprising:
    a) a media source for providing an audio/video media stream; and
    b) a computer for (i) receiving the audio/video media stream, (ii) generating an audio stream comprising a series of audio data and a video stream comprising a series of video frames and a set of audio data, and (iii) synchronizing the audio stream with the video stream based on the set of audio data in the video stream by determining a calculated sampling rate based on the set of audio data in the video stream and resampling the audio stream at the calculated sampling rate.

19. The system of claim 18, wherein the computer is further for receiving a request to begin capture of media data.

20. The system of claim 18, wherein the set of audio data in the video stream are duplicates of at least some of the audio data in the audio stream.

21. The system of claim 18, wherein the computer is further for multiplexing the audio stream and the video stream into a multiplexed media stream.

22. The system of claim 18, wherein synchronizing the audio stream with the video stream comprises utilizing at least one counter for counting the set of audio data in the video stream.

23. The system of claim 18, wherein synchronizing the audio stream with the video stream comprises calculating a time duration corresponding to the set of audio data in the video stream.

24. The system of claim 18, wherein synchronizing the audio stream with the video stream comprises calculating a total number of audio data in the audio stream that matches the set of audio data in the video stream.

* * * * *